United States Patent [19]

Meyers

[11] Patent Number: 5,485,235
[45] Date of Patent: Jan. 16, 1996

[54] POINTING SYSTEM FOR CORRECTLY AIMING AN IMAGE RECORDING APPARATUS TOWARDS A HUMAN SUBJECT

[75] Inventor: Mark M. Meyers, Hamlin, N.Y.

[73] Assignee: Eastman Kodak Company, Rochester, N.Y.

[21] Appl. No.: 245,993

[22] Filed: May 19, 1994

[51] Int. Cl.⁶ .................................................. G03B 13/20
[52] U.S. Cl. ..................... 354/165; 354/166; 354/219
[58] Field of Search .................................. 354/165, 166, 354/219

[56] References Cited

U.S. PATENT DOCUMENTS

| | | |
|---|---|---|
| 2,816,475 | 12/1957 | Waller et al. . |
| 3,402,635 | 9/1968 | Jacknau et al. . |
| 3,442,193 | 5/1969 | Pagel . |
| 4,777,501 | 10/1988 | Caimi et al. ............................. 354/64 |
| 4,876,816 | 10/1989 | Triplett ...................................... 42/103 |
| 4,918,476 | 4/1990 | Tejima ..................................... 354/221 |
| 4,963,017 | 10/1990 | Schneiter et al. ........................... 356/1 |
| 5,038,162 | 8/1991 | Tejima ..................................... 354/221 |
| 5,059,019 | 10/1991 | McCullough ............................. 352/131 |
| 5,189,463 | 2/1993 | Capper et al. ........................... 354/403 |
| 5,305,047 | 4/1994 | Hayakawa et al. ....................... 354/403 |

FOREIGN PATENT DOCUMENTS

| | | | |
|---|---|---|---|
| 182428 | 2/1936 | Germany . | |
| 2252836 | 8/1992 | United Kingdom | ......... G03B 15/035 |
| WO93/13452 | 7/1993 | WIPO | .............. G03B 13/02 |

*Primary Examiner*—Monroe H. Hayes
*Attorney, Agent, or Firm*—David A. Howley

[57] ABSTRACT

A camera includes a laser diode for emitting visible laser light towards a human subject whose image is to be recorded. The laser light is divided into a plurality of discrete, aiming beams of radiation by a pair of holographic and/or diffractive elements. The discrete beams are separated by a distance of at least about 7 mm. The laser light identifies where the camera is being aimed without damaging the retina of the human subject.

8 Claims, 5 Drawing Sheets

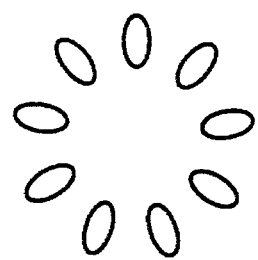
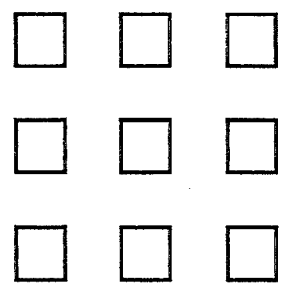
FIG. 7a        FIG. 7b
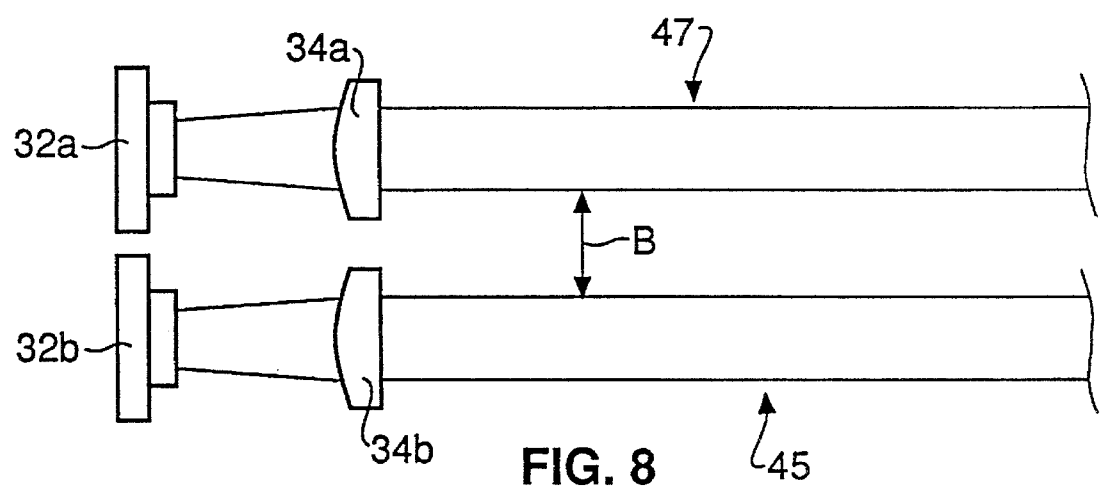
FIG. 8

POINTING SYSTEM FOR CORRECTLY AIMING AN IMAGE RECORDING APPARATUS TOWARDS A HUMAN SUBJECT

FIELD OF THE INVENTION

The invention relates generally to the field of image recording apparatus, and in particular to cameras. More specifically, the invention relates to a pointing system for correctly aiming an image recording apparatus towards a human subject.

BACKGROUND OF THE INVENTION

PCT Publication No. WO 93/13452, published Jul. 8, 1993 in the name of Capper, discloses a camera having an aiming mechanism. When a camera shutter button is partially depressed, the aiming mechanism produces a visible beam of light, for example a beam of laser light, which reflects off an object to be photographed, thereby indicating to the camera operator where the camera is aimed. The beam of laser light allows a camera operator to record images without having to look through a camera viewfinder to determine where the camera is aimed.

One of the chief advantages of a laser designator is that a high intensity spot is projected over a large distance with the divergence of the beam being determined by diffraction, which can be expressed mathematically using the laws of gaussian beam propagation. The high brightness of the laser spot makes it easy to recognize in what may be a busy scene being photographed.

When using laser light, it is important to assure that a person cannot be exposed to illumination power densities which exceed the human eye's damage threshold. These power densities are determined by laser safety standards which are set by various regulatory agencies. The illumination power density seen by the eye is determined by the power received at the pupil divided by the area of the pupil. The dilated pupil can reach about 7 mm in diameter. If the laser spot is incident on the pupil of a subject in a scene to be photographed, eye safety thresholds could be exceeded.

One way to solve this problem is simply to expand the beam to reduce its brightness However, such beam expansion reduces the observability of the laser designator to the photographer. As the distance from the camera to the scene increases, the expanded laser beam will begin to blend in with the scene illumination. As such, the laser designator will lose its effectiveness as an aiming mechanism.

SUMMARY OF THE INVENTION

The present invention is directed to overcoming one or more of the problems set forth above. Briefly summarized, according to one aspect of the present invention, a pointing system for correctly aiming an image recording apparatus towards a human subject includes means for producing a plurality of discrete, visible aiming beams of radiation. At least two of the beams are separated from each other by a distance slightly greater than the diameter generally of an eye-pupil of a human subject to prevent the two beams from simultaneously impinging on the eye-pupil when they are pointed towards the human subject. Also included are means for activating the producing means.

By producing a plurality of discrete, visible aiming beams of radiation, at least two of which are separated by a distance slightly greater than the diameter generally of an eye-pupil of a human subject, the maximum energy which can impinge on the pupil is kept below a damaging level. As such, potential damage to the human eye is avoided.

In a preferred embodiment of the invention, the beams are separated by a distance of between about 7 and 20 millimeters. Consequently, the plurality of beams will appear as a single, intense beam to a camera operator while still preventing eye damage.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 7a,b are patterns which can be created by the camera pointing system; and

FIG. 8 is an alternative embodiment of pointing system.

DETAILED DESCRIPTION OF THE INVENTION

Generally speaking, the present invention relates to redistributing sections of a collimated light beam into a plurality of beams which subtend an area which is larger than the pupil of the eye, without reducing the brightness of any particular segment.

In a preferred embodiment, in order that the light beam remains collimated and parallel to the camera axis while being distributed over a larger area, a pair of holographic (HOE) or diffractive optical elements are utilized. Within a segment of a first HOE, a diffraction grating (with or without focusing power) is formed with a grating frequency and orientation adjusted so that a fraction of the beam is deflected to a grating segment on a second HOE which has the same frequency and orientation as the first HOE but is at a larger radius from the center of the beam.

Figure 1:
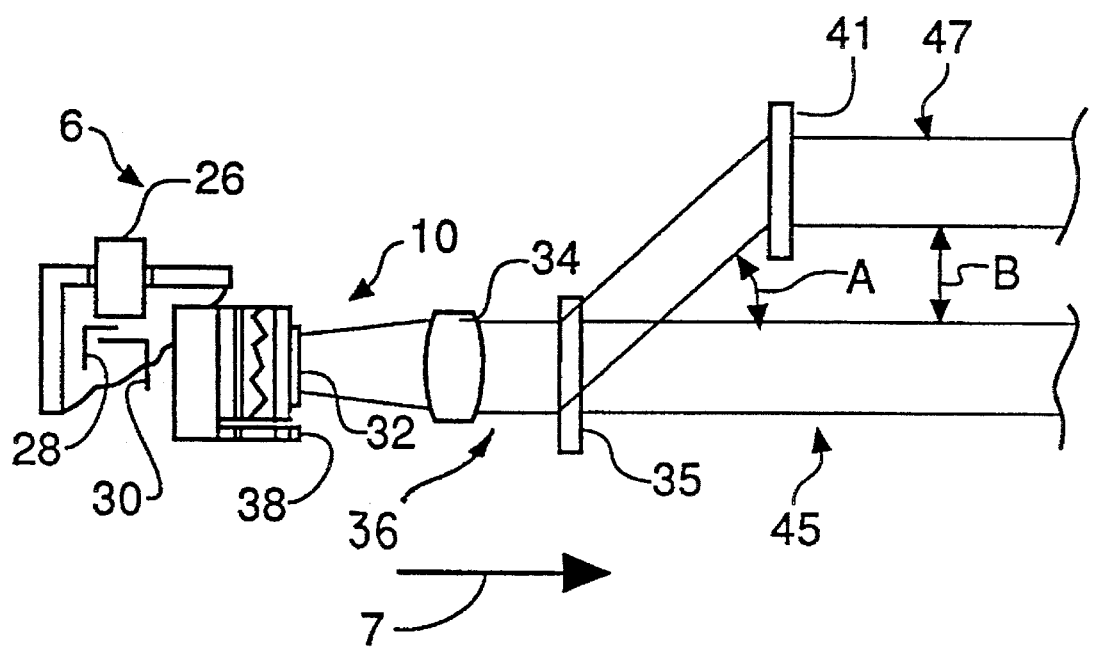
FIG. 1 is a schematic side view of a portion of a camera including a pointing system.

Referring now to FIG. 1, a preferred embodiment of the invention is illustrated in a camera 6 including a pointing system 10. The camera has an optical axis 7, is automatic in its operation, and is activated by a button 26 that is depressed to move through two positions engaging first and second switches 28 and 30, respectively. The first switch 28, connected to a camera power supply such as a battery (not shown), activates the pointing system which emits a visible laser light that indicates to a camera operator where the camera is pointed. As such, the camera operator need not look through a camera viewfinder to aim the camera. The second switch 30 activates a camera exposure operation to record an image.

The pointing system 10 projects a plurality of beams of radiation in a wavelength and intensity suitable for visibly designating a subject to be photographed. A surface or side emitting indium-gallium-aluminum phosphide (In(GaAl)P) laser diode 32 is depicted in the preferred embodiment with a collimating lens 34. The laser preferably is driven at one-half of a milliwatt (½ mw) for between about 1–5 seconds and is modulated at one kilohertz (1 khz). The combination laser and lens projects a narrow beam 36 of visible radiation. Typically the visible radiation appears red in color and is emmitted at a wavelength of six hundred and thirty nanometers (630 nm), with a bandwidth of approximately one to twenty nanometers (1–20 nm). Lasers emmitting blue or green visible light can also be used in the present invention. The output of the laser diode 32 is monitored by an adjacent photodetector 38, producing a signal representing the intensity of the laser beam.

Figure 2:
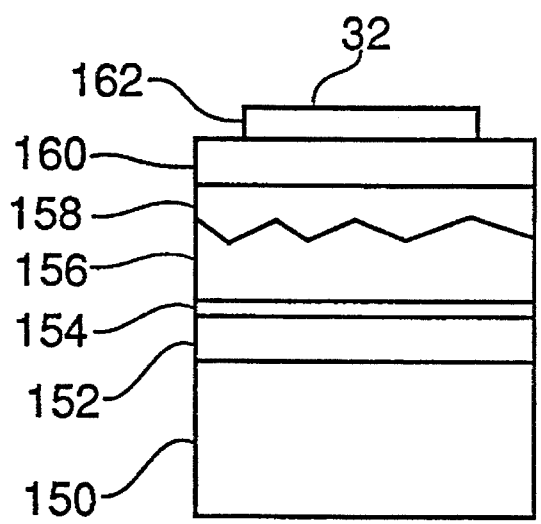
FIG. 2 is a schematic side view a laser diode used in the printing system of FIG. 1.

Turning now to FIG. 2, the preferred embodiment of laser diode 32 is a surface emitting distributed feedback (DFB) laser grown on a Gallium Arsenide (GaAs) substrate 150, which incorporates an N type indium gallium aluminum phosphide ( In (GaAl) P) cladding layer 152, an (InGaP/In(GaAl)P) quantum well active layer 154, and a P type (In(GaAl)P) separate confinement layer 156. A second order distributed feedback grating 158 is formed on the confinement layer 156, and is overgrown with a p type (In(GaAl)P) cladding layer 158 and a P type GaAs contact layer 160. The surface emitting electrode is represented at 162.

Figure 3:
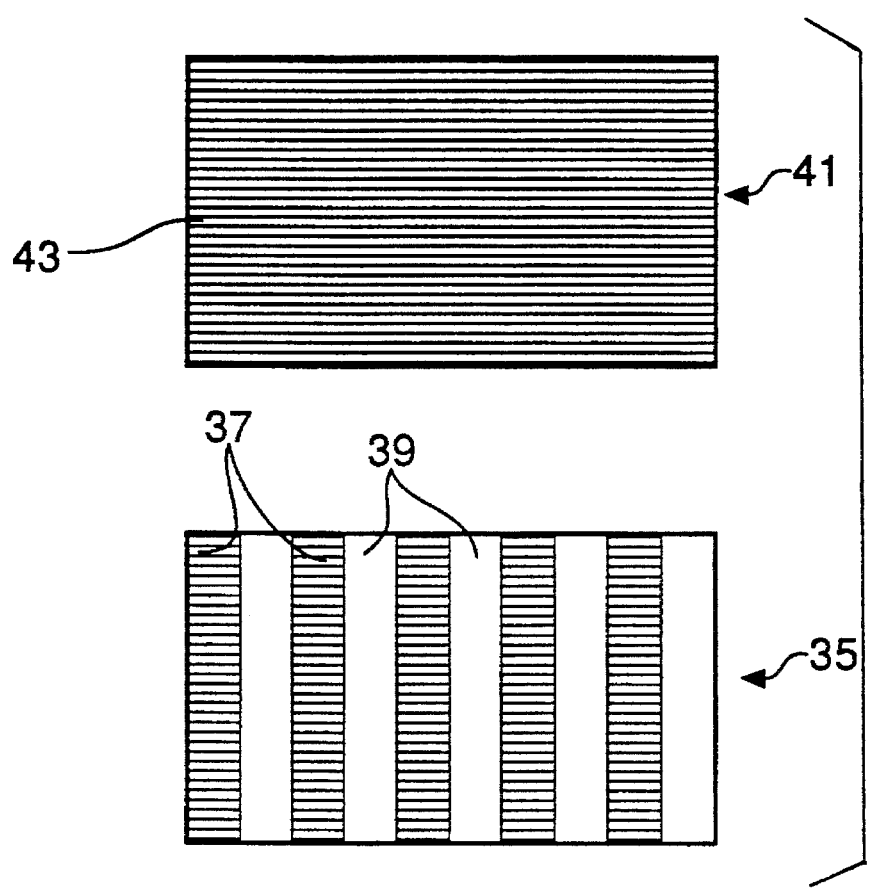
FIG. 3 is a schematic representation of a pair of holographic optical elements used in the pointing system of FIG. 1.

Referring to FIG. 1 and 3, after passing through lens 34, beam 36 is incident on a holographic optical element (HOE) 35 which includes a first diffraction grating 37 formed in 1 to 2 mm stripes 39 of equal width in between. The laser light incident on clear spaces 39 of HOE 35 is simply transmitted through the clear space without altering the path of beam 45. The grating vector of each segment of diffraction grating 37 is oriented to deflect the fraction of the laser beam incident upon it at an angle A.

The diffracted sections of the laser beam then propagate until they are incident on a second HOE 41 having a second diffraction grating 43 which has a grating vector which is equal to diffraction grating 37 with the blaze direction in the opposite orientation. As a result, HOE 41 diffracts beam 47 parallel to the camera's optical axis and to beam 45.

Alternatively, the grating pitch of HOE 41 can be designed such that beams 45 and 47 diverge from each other at a small angle of, for example, 1–5 degrees. Beams 45 and 47 can also be made to diverge from each other by eliminating HOE 41 and designing HOE 35 to diffract beams 45 and 47 at a small angle to each other. By having the beams diverge, it is ensured that the beams will not simultaneously impinge on the pupil of a human eye.

Figure 4:
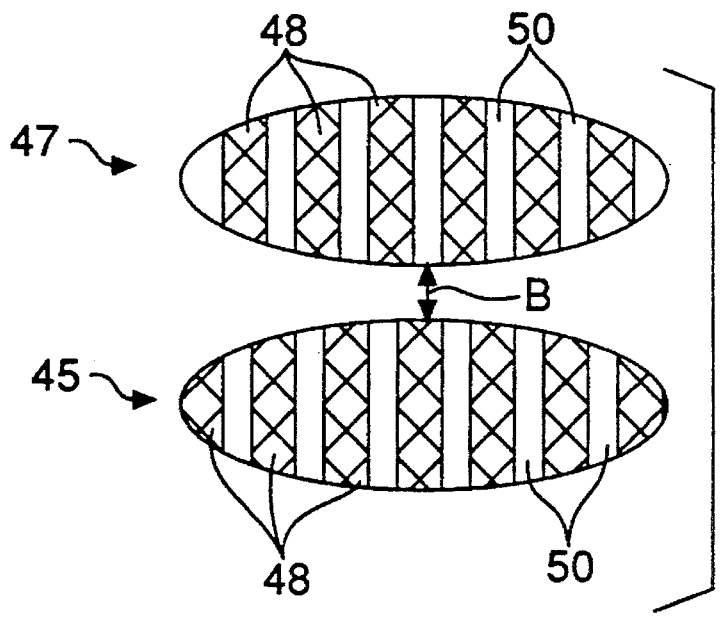
FIG. 4 is an end view of the light pattern generated by the pointing system of FIG. 1.

As displayed in FIG. 4, the output of the pointing device will be two discrete laser beams 45, 47 each having a series of bright light stripes 48 in a row. Bright light stripes 48 are separated by stripes 50 having no laser light rays in them. Beams 45, 47 are separated by a distance B which can be varied by changing the grating pitch of HOEs 35 and 41. Preferably, distance B is at least equal to a maximum diameter to which a human eye can dilate. This distance is typically about 7 millimeters.

By setting distance B to at least about 7 mm it can be assured that the power incident within the pupil of a human eye will not exceed the eye safety thresholds for an appropriate laser power setting. Of course, laser beam 36 can be split up into three or more discrete beams by varying the composition of the HOEs used in the pointing system.

By separating the beams between about 7–20 mm, the brightness (and therefore the observability) of the beams is preserved while the power intercepted by the eye pupil is reduced below its safety threshold. Another advantage is that to the camera observer the projected spot is very small and intense even though it is divided into a plurality of beams. The beams are close enough to each other to appear to be a single spot when viewed at a distance.

The eye's minimum resolvable angular subtense is around 1 arc min. At sufficiently large distances, the angular subtense of the segmented spot will be less than that resolvable by the eye and the observed brightness will be equivalent to that produced if the beam was not segmented. In other words, beams 45 and 47 will appear as a singular beam to a camera operator.

The properties and methods of manufacturing holographic optical elements of the type used in the preferred embodiment are known in the prior art. Examples include the disclosure in my U.S. Pat. No. 5,039,183, issued Aug. 13, 1991; and an article entitled "Designing and Constructing Thick Holographic Optical Elements," published in Applied Optics, Volume 17, Number 8, dated Apr. 15, 1978. The disclosures of the last mentioned patent and publication hereby are incorporated by reference into this specification.

Figure 5:
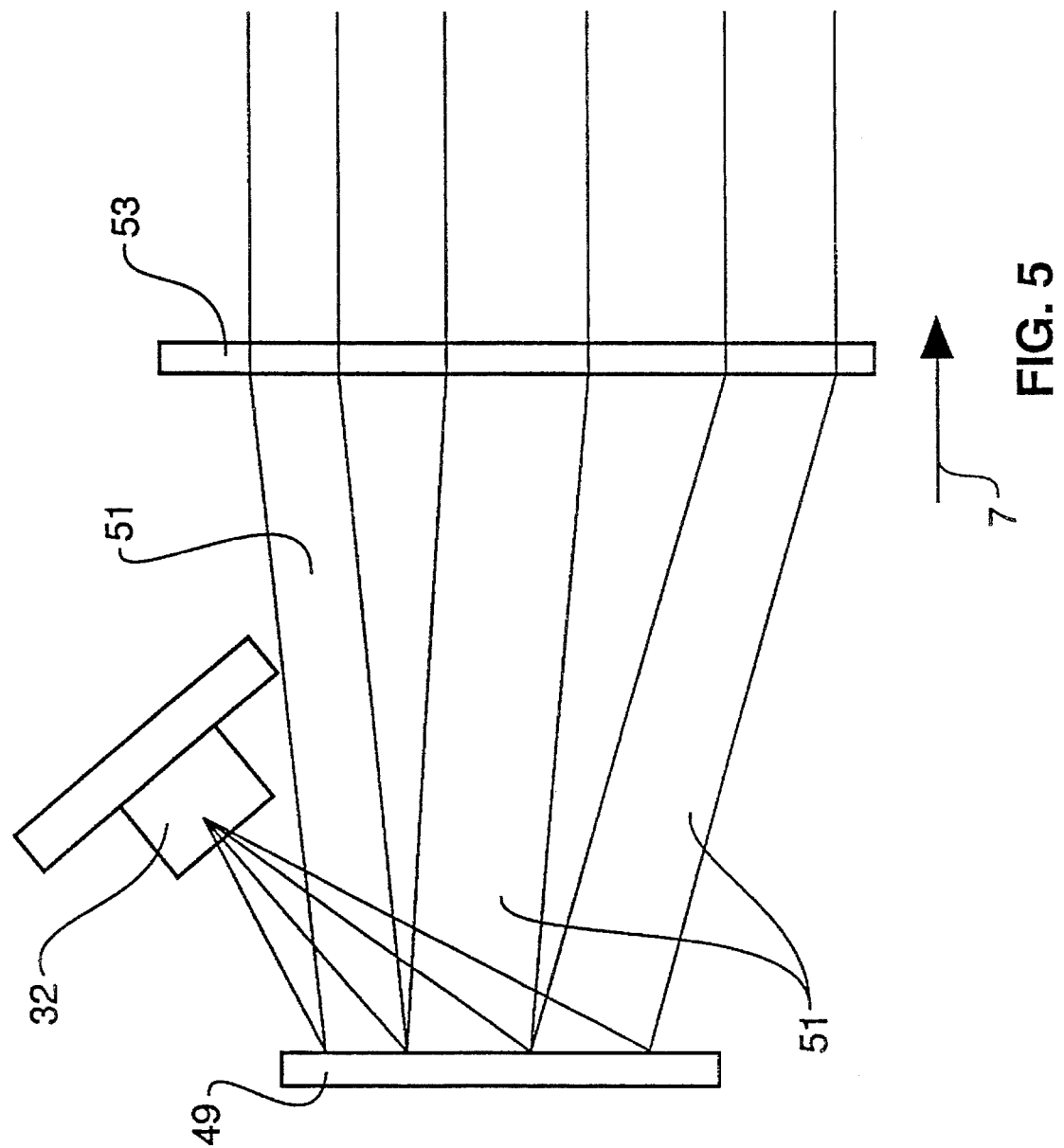
FIG. 5 is an alternative embodiment of a pointing system usable in a camera.

Turning now to FIG. 5, a second embodiment of the invention is disclosed in which the function of the laser collimator lens and the first segmenting HOE are combined into one focusing HOE which collimates the beam and splits it into multiple segments. The collimating, segmenting element can be formed as a transmissive element or, as in FIG. 5, as an off axis reflective element (for compactness).

Laser diode 32 is utilized with an off-axis HOE 49 which collimates and segments the laser beam emitted from the laser diode into a plurality of discrete beams 51. A corresponding second HOE 53 diffracts the segmented beams parallel to camera optical axis 7. Since the elements are HOEs or diffractive (binary) elements, aspheric surface coefficients which significantly improve the wavefront quality can be included at no additional cost.

Figure 6:
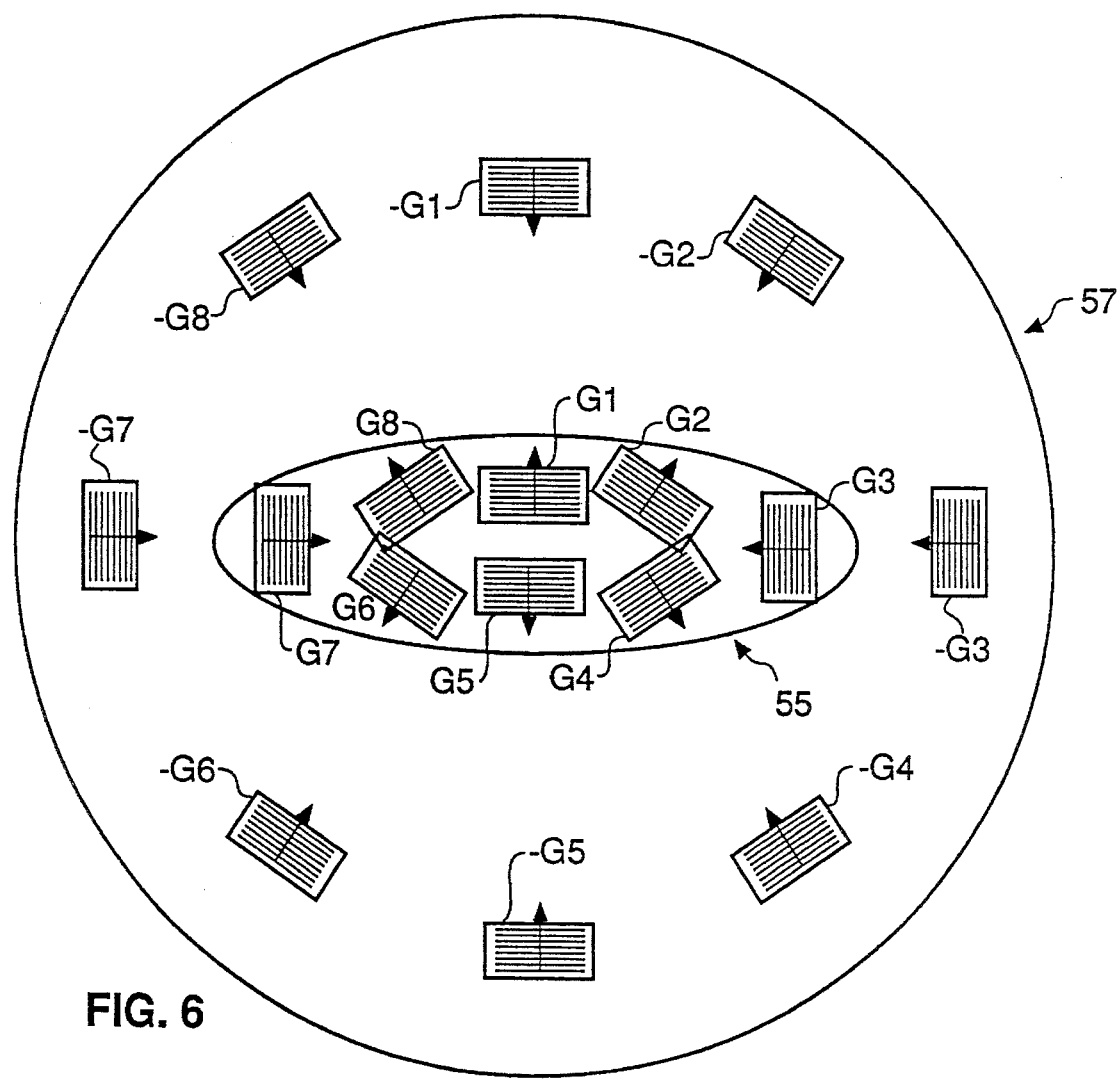
FIG. 6 is an end view of a pair of holographic optical elements usable in a camera pointing system.

Turning to FIG. 6, a third embodiment of the invention is displayed in which a more complicated distribution of grating vectors is utilized. FIG. 6 is an end on view of two multiply segmented HOEs 55,57 which are aligned with each other along an axis parallel to the camera's optical axis (into and out of the paper of FIG. 6). HOE 55 includes a series of closely spaced, radially oriented, linear gratings G1 through G8. HOE 57 includes grating segments –G1 through –G8 at larger radii, with their blaze angles oppositely oriented so as to efficiently diffract the light parallel to the optical axis.

In this case, a circular pattern, such as that shown in FIG. 7a, is projected onto the scene. By selecting the number and placement of the gratings in the HOEs as well as the blaze angles, the collimated laser beam can be rearranged into a variety of different patterns, such as a square (FIG. 7b), starburst or other arbitrary pattern. The grating vector magnitude and angular orientation in the first and second HOEs are adjusted at each segment to map the initial beam distribution into the desired final pattern. The orientation and distribution of the diffracted sections of the laser beam can be adjusted in numerous different patterns, depending on the needs and desires of the customer. Each of the discrete beams should preferably be separated from the other beams by a distance sufficient to prevent damage to a human eye.

Another advantage of the above embodiments is that they are insensitive to the wavelength of the laser diode since any angular deviation of the diffracted beam from nominal due to change in wavelength is compensated for by an equal and opposite deviation at the second grating.

All of the above embodiments can be formed holographically in volume holographic materials such as dichromated gelatin, in surface relief materials such as photoresist or they can be formed using a microlithographic type patterning and etching process (called binary or diffractive elements in the literature). The diffractive elements can also be formed as masters which are then used to replicate or injection mold production quantities of parts.

Turning to FIG. 8, a further embodiment of the present invention is represented. In this embodiment, a pair of laser diodes 32a,b each emit a visible laser beam. Each laser diode is preferably driven at ¼ of a milliwatt. Each laser beam is collimated respectively by collimating lenses 34a,b to produce collimated laser beams 45, 47. In this embodiment, an additional laser diode and collimating lens are required. However, the HOEs of the earlier embodiments have been eliminated. Again, collimated laser beams are separated by a distance B of at least about 7 mm.

Although a surface emitting laser is depicted, an edge emitting laser can be used. Also, if the pointing system is to be used over short distances (e.g. 2–4 meters), a light emitting diode or other visible emitter can be employed. Further, the pointing system can be used with numerous image recording apparatus such as cameras, camcorders, movie cameras etc.

While the invention has been described in connection with preferred an alternative embodiments, other modifications and applications will occur to those skilled in the art. The claims should be interpreted to fairly cover all such modifications and applications within the true spirit and scope of the invention.

PARTS LIST FOR FIGURES

6—Camera.
7—Optical axis.
10—Pointing system.
26—Actuation button.
28—First switch.
30—Second switch.
32—Laser diode.
34—Collimating lens.
35—HOE
36—Narrow beam.
37—Diffraction Grating.
A—Angle.
B—Distance.
–G1 to –G8 —Gratings.
–G1 to –G8 —Gratings
38—Monitoring photodetector.
39—Clear spaces.
41—HOE.
43—Diffraction grating.
45—Laser beam.
47—Laser beam.
48—Light stripes.
49—Off-axis HOE.
50—Stripes.
51—Laser beams.
53—HOE.
55—HOE.
57—HOE. 150—Substrate.
152—Cladding layer.
154—Active layer.
156—Confinement layer.
158—Grating.
160—Contact layer.
162—Electrode.

I claim:

1. A pointing system for correctly aiming an image recording apparatus towards a human subject, comprising:

means for producing a plurality of discrete, visible aiming beams of laser radiation, at least two of which are separated from each other by a distance slightly greater than the diameter generally of an eye-pupil of a human subject to prevent said two beams from simultaneously impinging on the eye-pupil when they are pointed towards the human subject; and means for activating said producing means.

2. The pointing system of claim 1, wherein said producing means includes:

a radiation emitter for emitting visible radiation towards said human subject; and means for dividing said visible radiation into said plurality of discrete, visible aiming beams of radiation.

3. The pointing system of claim 2, wherein said dividing means includes one or more holographic and/or diffractive elements.

4. The pointing system of claim 1, wherein said producing means includes:

a plurality of radiation emitters for emitting said plurality of discrete, visible aiming beams of radiation towards said human subject.

5. The pointing system of claim 1, wherein said distance is about 7 millimeters or more.

6. The pointing system of claim 1, wherein said distance is between about 7 and 20 millimeters.

7. The pointing system of claim 1, wherein said beams are essentially parallel with each other.

8. The pointing system of claim 1, wherein said beams diverge from each other by an angle of between about 1–5 degrees.

* * * * *